United States Patent
Fukushima et al.

(10) Patent No.: US 6,224,313 B1
(45) Date of Patent: *May 1, 2001

(54) AUTOMATIC WAREHOUSE

(75) Inventors: Masazumi Fukushima, Nishikasugai-gun; Tamotsu Shiwaku, Kani, both of (JP)

(73) Assignee: Murata Kikai Kabushiki Kaisha, Kyoto (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/052,083

(22) Filed: Mar. 31, 1998

(30) Foreign Application Priority Data

Apr. 1, 1997 (JP) ..................... 9-099772

(51) Int. Cl.⁷ ...................... B65G 1/00
(52) U.S. Cl. ................ 414/280; 414/225; 414/940
(58) Field of Search ................ 414/280, 225, 414/940, 277, 744.5

(56) References Cited

U.S. PATENT DOCUMENTS

| | | |
|---|---|---|
| 4,930,828 * | 6/1990 | Katae et al. ............ 414/280 |
| 4,993,913 | 2/1991 | Ohtsuki . |
| 5,151,008 * | 9/1992 | Ishida et al. ............ 414/744.5 |
| 5,328,316 * | 7/1994 | Hoffmann ............ 414/273 |
| 5,362,192 * | 11/1994 | Dang ............ 414/280 |
| 5,466,109 * | 11/1995 | Iizuka ............ 414/283 |
| 5,558,483 * | 9/1996 | Masuda ............ 414/280 |
| 5,628,604 * | 5/1997 | Murata et al. ............ 414/940 |
| 6,024,425 * | 2/2000 | Imai et al. ............ 312/35 |

FOREIGN PATENT DOCUMENTS

| | | | |
|---|---|---|---|
| 92504 * | 4/1988 | (JP) | ............ 414/280 |
| 405294410 * | 11/1993 | (JP) | ............ 414/940 |
| 9-169407 | 6/1997 | (JP) | . |
| 1687532 * | 10/1991 | (SU) | ............ 414/277 |

* cited by examiner

*Primary Examiner*—Thomas J. Brahan
(74) *Attorney, Agent, or Firm*—Armstrong, Westerman, Hattori, McLeland & Naughton, LLP

(57) ABSTRACT

To provide an automatic warehouse that can elevate and lower an elevating rail stably even if racks are high, and that allows effective use of the space between the racks for maintenance. Elevation drive sections for an elevating rail 3 are provided near the respective ends of one of racks 1 and 2, a rope 40 attached to a rail-supporting member 12 is wound around a drum 22, and a counterweight 24 is used to balance the effect of gravity in order to elevate and lower a rail 3. A travelling cart 4 travels on the rail 3, and the rotation of a turntable 5 and the rotation of arms 6 and 7 and a hand 11 are used to load and unload an article on and from the rack 1 or 2.

4 Claims, 6 Drawing Sheets

AUTOMATIC WAREHOUSE

FIELD OF THE INVENTION present invention relates to an improved automatic warehouse.

BACKGROUND OF THE INVENTION

In a typical automatic warehouse, a pair of racks are disposed on a floor surface in a parallel at an interval, a rail is laid on the floor surface in the space between the racks, and a travelling body including a loading apparatus travels on the rail. In this configuration, however, when the racks are high, the height of a mast on the loading apparatus must be increased, resulting in unstable loading. In addition, the floor surface in the space between the racks is occupied by the rail and travelling body, preventing easy maintenance.

It is an object of the present invention to allow the space between the racks to be used easily for maintenance and to enable an article to be transferred and loaded appropriately between the travelling body and racks.

It is an additional object of the present invention to further stabilize the elevation and lowering by means of the elevating rail.

It is an additional object of the present invention to enable an article to be loaded on both racks appropriately even if the space between the racks is narrower than in a conventional type.

It is an additional object of the present invention to provide a structure of an automatic warehouse with an increased capacity.

SUMMARY OF THE INVENTION

The present invention provides an automatic warehouse in which a pair of opposed racks are disposed in parallel at an interval, characterized in that elevation drive sections provided near opposite ends of one of the racks support, elevate and lower an elevating rail, and in that a travelling body is provided that travels along the elevating rail to load an article on each of the racks.

Preferably, a guide member for guiding the elevation and lowering of the elevating rail is provided near the center of the rack on which the elevation drive sections are provided.

Preferably, a turntable is provided on the travelling body that has a first arm, that oscillates relative to the turntable, a second arm that oscillates in a direction opposite the oscillating direction of the first arm, and a hand member borne on the second arm by an oscillating shaft to support an article, to transfer and load an article between the travelling body and the racks.

To increase the capacity, the racks are extended at their respective end and the elevating rail protrudes from the elevation drive section toward the end of the rack.

According to the present invention, the elevation drive sections are provided near the opposite ends of one of the racks to elevate and lower the elevating rail. He travelling body travels along the elevating rail to load an article onto each of the racks. As a result, the need for the rail to be laid on the floor in the space between the racks is eliminated to allow the travelling body to pause at the upside of the elevation rail, thereby enabling the automatic warehouse to be maintained easily. Since the elevating rail is supported near both its opposite ends by the elevation drive sections, the elevating rail is supported stably and articles can be transferred and loaded appropriately compared to the transfer and loading of articles between the travelling body supported on the floor surface and on the racks via a high mast. Since the elevation drive sections in the present invention are provided on only one of the racks, the automatic warehouse can be installed easily and the space occupied by the elevation drive sections can be reduced, compared to an installation on both racks.

According to the present invention, the guide member for guiding the elevation and lowering of the elevating rail is provided near the center of the rack on which the elevation drive sections are provided. Thus, the elevating rail is supported at three points, that is, by the elevation drive sections near the opposite ends and the guide member near the center, thereby further stabilizing the elevation and lowering of the elevating rail.

According to the present invention, a turntable is provided on the travelling body and a first arm that oscillates relative to the turntable; a second arm that oscillates in a direction opposite to the oscillating direction of the first arm; ;and the hand member borne on the second arm by the oscillating shaft to support an article are provided. When the first arm is oscillated, the second arm oscillates in the opposite direction and the oscillation of the first arm causes the oscillating arm bearing the hand member to linearly move back and forth to enable an article to be transferred and loaded smoothly. In addition, since the oscillating shaft bearing the hand member can oscillate relative to the second arm, the direction of the hand member is fixed despite the oscillation of the second arm, thereby preventing the hand member from colliding against the racks.

The present invention has a structure where the capacity of the warehouse can be increased by extending the racks. The racks are preferably extended from both ends, or at least from their respective end, and the elevating rail protrudes from the elevation drive section toward the end of the rack. The extension of the racks increases the capacity, and the elevating rail can be elevated and lowered stably despite its protrusion from the elevation drive sections because it is supported at at least two points near the respective ends of the original rack. dr

DETAILED DESCRIPTION OF THE PREFERRED EMBODIMENTS

Figure 1:
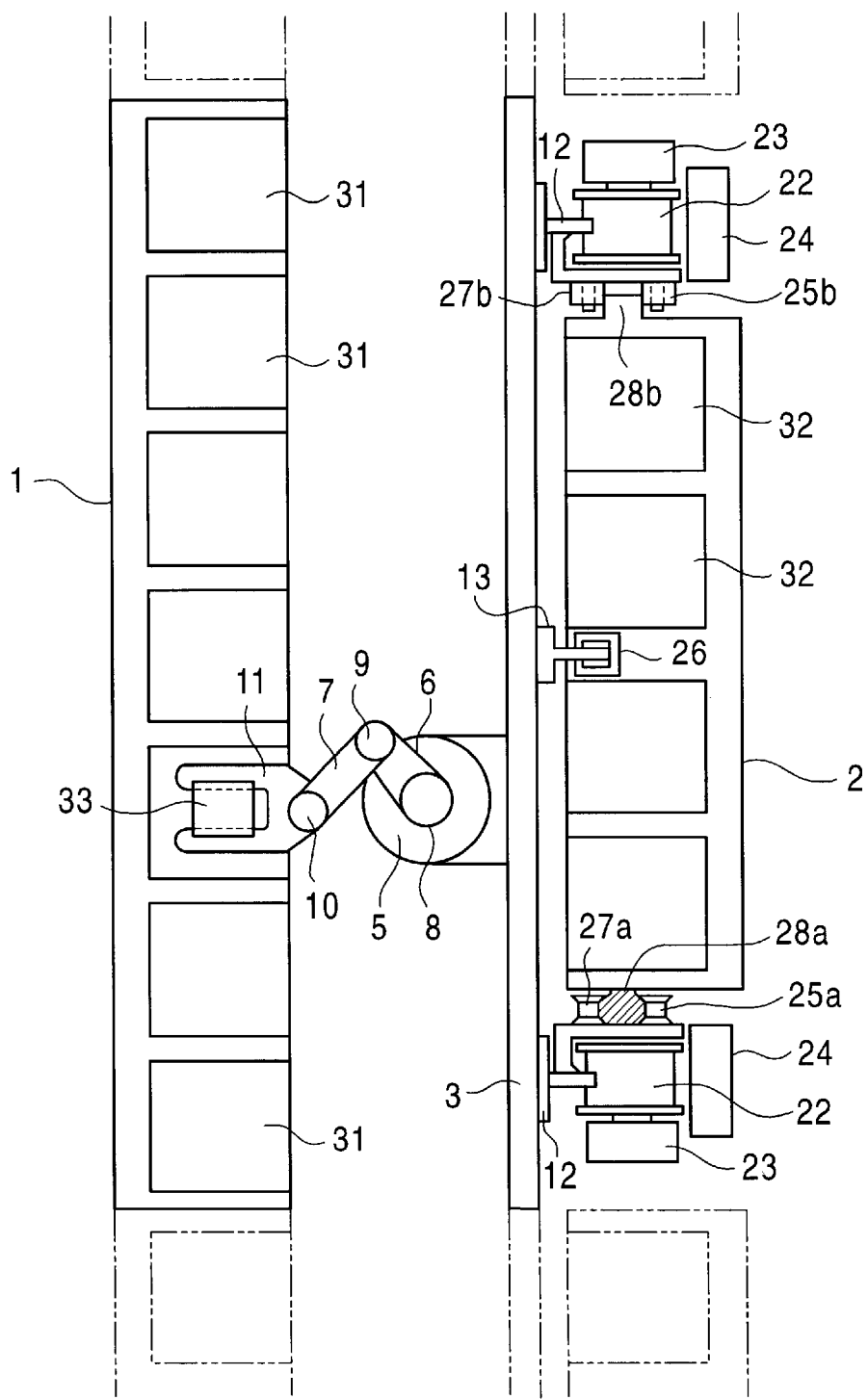
FIG. 1 is a schematic top view of an automatic warehouse according to one embodiment of the present invention.
Figure 2:
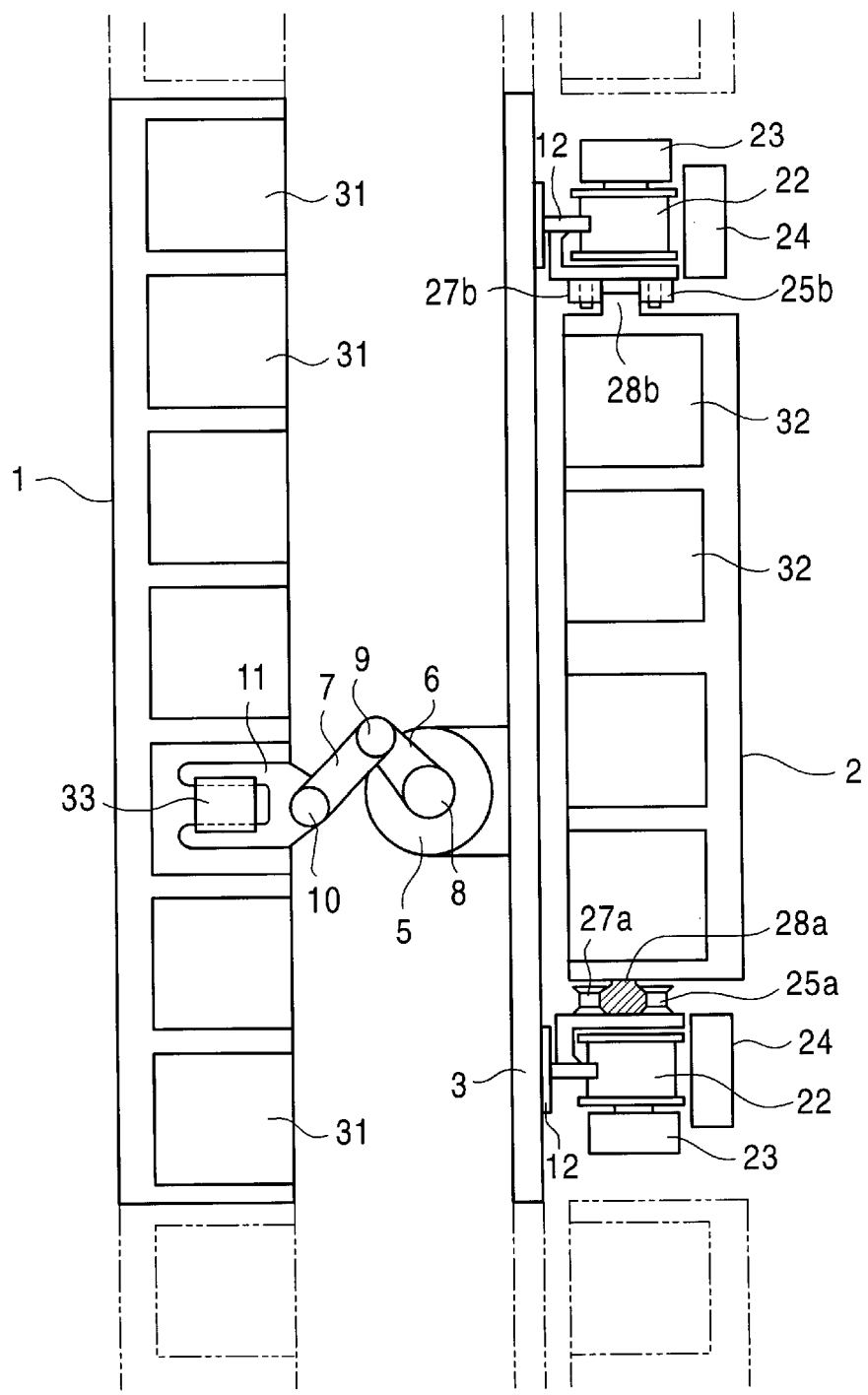
FIG. 2 is a schematic top view of an automatic warehouse according to a variation.
Figure 3:
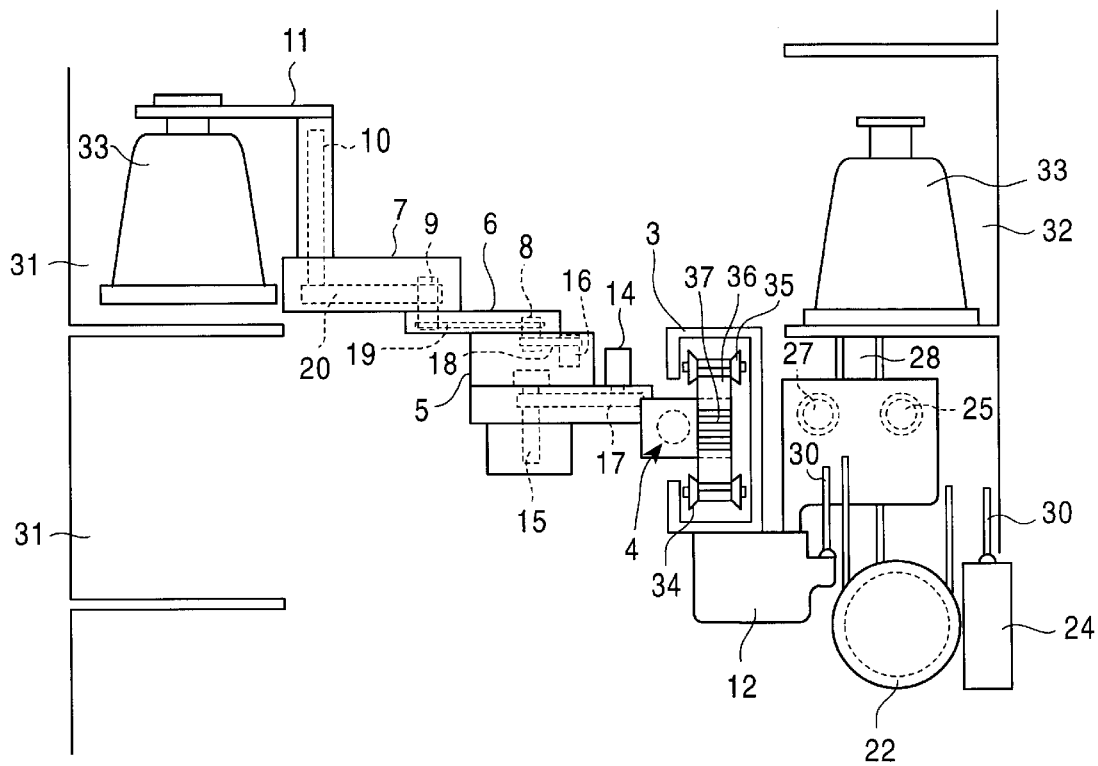
FIG. 3 is a schematic side view of the automatic warehouse according to the one embodiment.

FIGS. 1 to 6 shows an embodiment and its variations. FIGS. 1 to 3 show an integral part of an automatic warehouse according to one embodiment.

In FIG. 1, 1 and 2 are a pair of racks disposed opposite each other and in parallel. An elevating rail 3, that has rail supporting members 12, 12 near the opposite ends, is supported, elevated and lowered by elevation drive sections provided near the opposite ends of the rack 2. Another rail supporting member 13 (FIG. 1) is provided near the center of the elevating rail 3 and supported by a guide rail 26 provided near the center of the rack 2. A travelling cart 4, has a turntable 5 that can rotate through 360 degrees (°) relative to the travelling cart 4. A first arm 6, and a second arm 7 are provided. The first arm 6 is installed so as to rotate around a rotating shaft 8 relative to the turntable 5 and the second arm 7 is installed so as to rotate around a rotating shaft 9 relative to the first arm 6. A rotating shaft 10 enables a hand member 11 to rotate relative to the second arm 7. Although the rotating shafts 8, 9 and 10 can rotate through 360°, they must only oscillate through a predetermined angle.

In FIG. 3, the structure of the traveling cart 4 is described. The rail 3 is, for example, a monorail, 36 is a rack provided along the rail 3 and 37 is a pinion engaging the rack 36 and rotated by a motor (not shown in the drawing) for the travelling cart 4. The pinion 37 is rotated to move the travelling cart 4 forward. A travelling mechanism for the travelling cart 4 and a mechanism for the rail 3 can be configured arbitrarily.

In FIG. 3, 14 is a turntable motor, 15 is a shaft used to rotate the turntable 5 and 16 is an arm drive motor. The turntable motor 14 rotates a belt 17 to cause the shaft 15 to rotate the turntable 5. Likewise, the arm drive motor 16 rotates the rotating shaft 8 via a belt 18, thereby rotating the first arm 6. The rotation of the rotating shaft 8 is transmitted to the rotating shaft 9 via a belt 19 to rotate the second arm 8 relative to the first arm 6. In addition, the rotation of the rotating shaft 9 is transmitted to the rotating shaft 10 of the hand member 11 through the belt 20 to rotate the hand member 11. In addition, the rotation of the turntable 5 is independent of the rotation of the arms 6 and 7 and hand member 11, and the arm 7 rotates in the direction opposite the rotational direction of the arm 6, whereas the hand member 11 rotates in the same direction as the arm 6. These operations can be implemented by the belts 18, 19 and 20.

Figure 6:
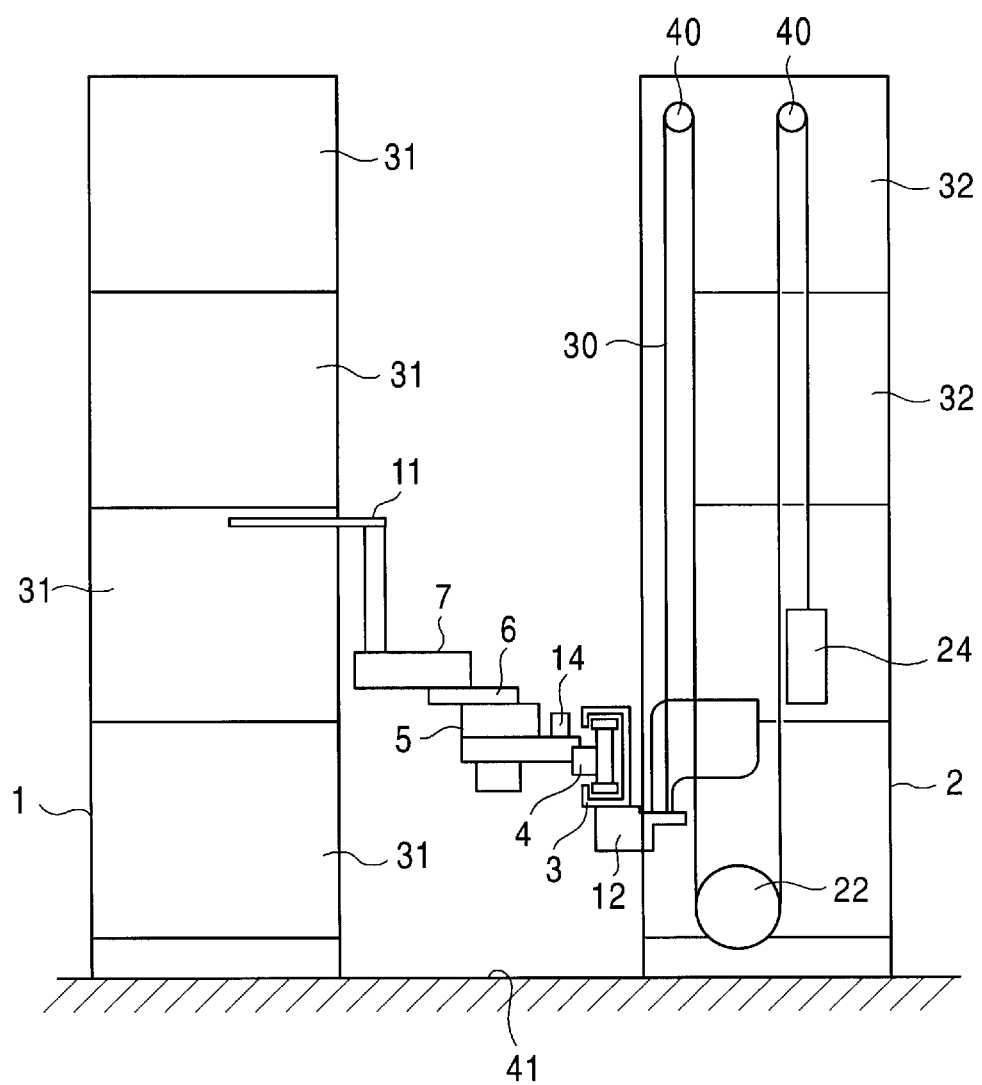
FIG. 6 is a side view of the automatic warehouse according to the one embodiment.

A hanging member 30, FIG. 3, such as a rope or a belt, is attached to the rail supporting members 12, 12 and is wound around a winding drum 22 (FIG. 6) via supporting rollers 40, shown in FIG. 6. A pair of rollers 25a and 27a or 25b and 27b are provided at the end of the rail supporting member 12 in such a way that the rail 3 is elevated and lowered along guide rails 28a and 28b. A counterweight 24 is connected at the other end of the hanging member 30. A guide member such as a guide rail 26 is provided near the center of the rack 2 to guide rollers provided at the end of the rail supporting member 13. The rail supporting member 13 and guide rail 26 can be omitted as shown in FIG. 2. An individual storage position 31 is provided in the rack 1, and an individual storage position 32 is provided in the rack 2, while 33 is an article.

Figure 4:
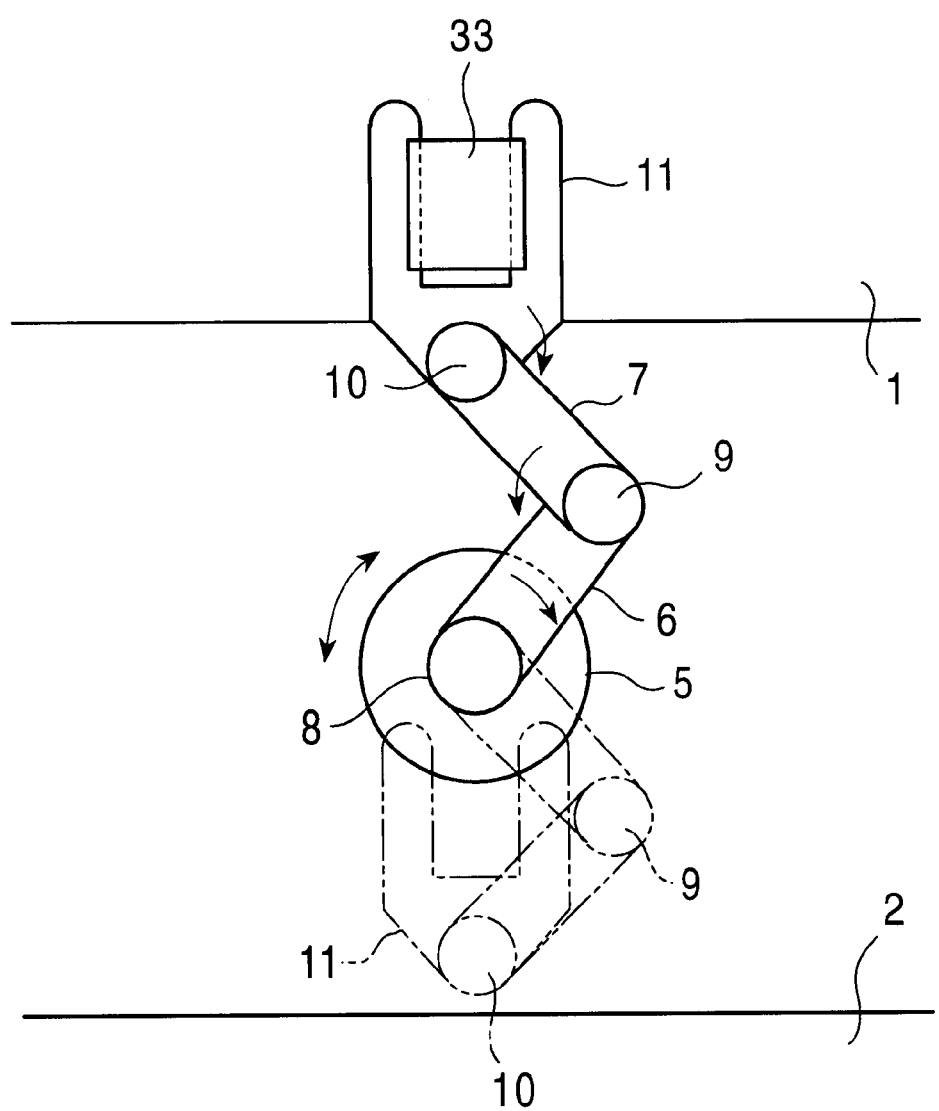
FIG. 4 is a top view of a loading apparatus in the automatic warehouse according to the one embodiment.

FIG. 4 shows a mechanism for transferring and loading the article 33 using the turntable 5 and hand member 11. In this figure, the rail 3 and the travelling cart 4 are omitted. For example, the removal of the article 33 from the rack 1 is explained. The continuous line in FIG. 4 shows that the hand member 11 supports the article 33. The rotating shaft 8 is rotated, for example, clockwise to rotate the rotating shaft 9, for example, counterclockwise. The rotating shaft 10 bearing the hand member 11 thus rotates clockwise, as does the rotating shaft 8. Then, the rotating shaft 10 for the hand member 11 linearly moves backward from the state shown by the continuous line to the state shown by the chain line in FIG. 4 and the hand member 11 rotates in the direction opposite the rotating direction of the arm 7, so the direction of the hand member 11 remains unchanged, as seen from the racks 1 and 2. Thus, the hand member 11 linearly moves back and forth in the same direction without colliding against the rack 1. The movement is the reverse of the foregoing when the article 33 is housed in the rack 1. As is apparent from the chain line in FIG. 4, the hand member 11 can transfer and load the article 33 on only the rack 1 unless the turntable 5 is rotated. If the article is loaded on the rack 2, the turntable 5 is rotated through 180° to transfer and load the article in the same manner.

Figure 5:
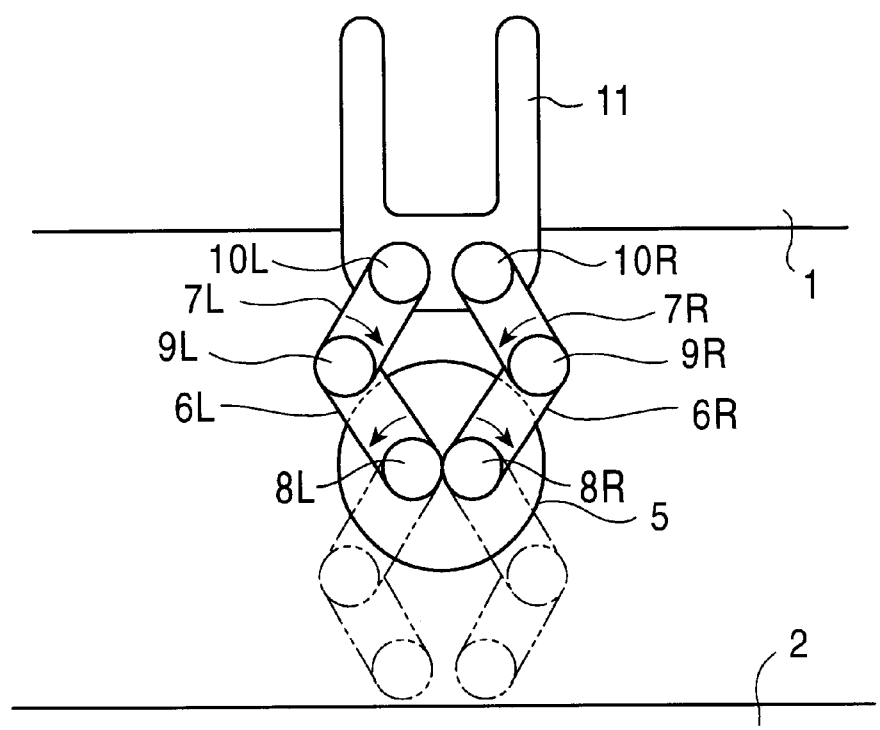
FIG. 5 is a top view of the loading apparatus in the automatic warehouse according to another embodiment.

FIG. 5 shows a variation of the loading apparatus. According to this variation, the first and second arms are provided on the right and left sides, respectively, and the rotating shafts for the hand member 11 are also provided on the right and left sides. That is, first arms 6R and 6L, second arms 7R and 7L, and rotating shafts 8R, 8L, 9R, 9L, 10R, and 10L are provided.

In contrast to the embodiments in FIGS. 1 to 4, the rotating shafts 9R and 9L, as well as 10R and 10L, are slave shafts, and rotate in response to the oscillation of the arms 6R and 6L. According to this variation, the rotating shafts 8R and 8L connected to an arm driving motor 16 rotate in opposite directions, and since the tips of the second arms 7R and 7L are connected to the hand member 11 through the rotating shafts 10R and 10L, the hand member 11 linearly moves backward in the same direction from the state shown by the continuous line as the rotating shafts 8R and 8L rotate, and is housed on the turntable 5. According to this variation, the hand member 11 can also transfer and load the article on only the rack 1 unless the turntable 5 is rotated. The turntable 5 is rotated through 180° to transfer and load the article onto the rack 2.

FIG. 6 shows the overall structure of an automatic warehouse according to the present invention. Although not limited to such applications, the automatic warehouse may be used, for example, to store devices in a clean room.

The rail 3 is supported by the rail supporting members 12, 12 and 13 and is elevated and lowered along the rack 2 as the winding drum 22 rotates. The travelling cart 4 travels on the elevating rail 3. Thus, there is no rail on the floor between the racks 1 and 2, and elevating the elevating rail 3 enables a large space to be provided between the racks 1 and 2, thereby allowing easy maintenance for the winding drum 22, winding motor 23, or other mechanisms.

The elevating rail 3 is elevated and lowered stably because the neighborhood of both of its opposite ends are supported by the supporting member 12, 12 and because the neighborhood of its center (FIG. 1) is supported by the supporting member 13. Thus, the travelling cart 4 can be stably supported by the rail 3 to enable the article to be transferred and loaded appropriately. Furthermore, the elevating rail 3 is elevated and lowered, so even if the racks 1 and 2 are high, loading can be executed stably by correspondingly raising the elevating rail 3. In addition, the pair of arms 6 and 7, that rotate in opposite directions, are provided on the turntable 5, and the rotating shaft 10 at the end of the arm 7 bears the hand member 11. Consequently, the hand member 11 linearly moves in the same direction relative to the racks 1 and 2, so the interferential range is narrow and the article 33 can be transferred and loaded simply.

If the number of the racks 1 and 2 is increased to increase the capacity of the automatic warehouse after installation, the elevating rail 3 may be extended on both ends of existing racks 1 and 2, for example, as shown by the chain line in FIG. 1. In this case, since the elevating rail 3 is supported near the opposite ends of the existing racks 1 and 2, the elevating rail can be elevated and lowered stably even if it is extended. Thus, the capacity of the existing automatic warehouse can be increased easily without changing the layout of facilities in the clean room. Not only can the capacity be simply increased after installation, but an automatic warehouse of a desired capacity can also be obtained by extending the racks 1 and 2 and elevating rail 3 as required, using as the standard the racks 1 and 2 shown by the continuous line in FIGS. 1 and 2.

What is claimed is:

1. An automatic warehouse having a pair of parallel opposed open faced racks having a fixed interval therebetween, characterized in that elevation drive sections are positioned at the opposite ends of one of said open faced racks for supporting, elevating and lowering an elevating rail between said ends, with each elevation drive section having a drive source, and a traveling cart, having a turntable rotatable through 360 degrees mounted on said cart, and with said turntable mounted thereon, being movable along said rail between said open faced racks for loading and unloading articles on said racks to be stored and articles on said racks to be removed from storage.

2. An automatic warehouse as in claim 1 characterized in that a guide member for guiding said elevating rail as said rail is raised and lowered is positioned near the center of the rack on which said elevation drive sections are positioned.

3. An automatic warehouse as in claim 1 or 2 characterized in that a turntable is positioned on said traveling body having a first arm that oscillates relative to said turntable is positioned on said turntable; a second arm that oscillates in a direction opposite to the oscillating direction of said first arm is positioned on said turntable; and a hand member maintained on said second arm by an oscillating shaft for supporting an article are mounted for transferring and loading articles between said traveling body and said racks.

4. An automatic warehouse as in claim 1 or 2, characterized in that said elevating rail protrudes from said elevation drive section at the end of said racks.

\* \* \* \* \*